United States Patent [19]
Cahill

[11] Patent Number: 5,150,384
[45] Date of Patent: Sep. 22, 1992

[54] CARRIER RECOVERY METHOD AND APPARATUS HAVING AN ADJUSTABLE RESPONSE TIME DETERMINED BY CARRIER SIGNAL PARAMETERS

[75] Inventor: Stephen V. Cahill, Palatine, Ill.

[73] Assignee: Motorola, Inc., Schaumburg, Ill.

[21] Appl. No.: 590,401

[22] Filed: Sep. 28, 1990

[51] Int. Cl.$^5$ ............................................. H04B 1/30
[52] U.S. Cl. ................................... 375/97; 329/360; 455/260
[58] Field of Search ................ 375/77, 97; 455/257, 455/258, 259, 260, 324; 331/17; 329/323, 325, 326, 356, 358, 360, 361

[56] References Cited

U.S. PATENT DOCUMENTS

| | | | |
|---|---|---|---|
| 3,447,084 | 5/1969 | Haner et al. | 455/260 |
| 3,768,030 | 10/1973 | Brown et al. | 455/260 |
| 4,091,410 | 5/1978 | Citta | 329/360 |
| 4,336,616 | 6/1982 | Frosch et al. | 329/360 |
| 4,419,759 | 12/1983 | Poklemba | 375/97 |
| 4,466,108 | 8/1984 | Rhodes | 375/97 |
| 4,473,801 | 9/1984 | Maurer et al. | 329/360 |
| 4,485,487 | 11/1984 | Allen et al. | 329/360 |
| 4,595,927 | 6/1986 | Merick | 328/155 |
| 4,829,543 | 5/1989 | Borth et al. | 375/83 |
| 4,847,869 | 7/1989 | Labedz et al. | 375/85 |

OTHER PUBLICATIONS

Introduction to Communication Systems by Ferrel G. Stremmler, pp. 590-596, Addison-Wesley Publishing Co: Reading, Mass.: 1982.

Digital Communications by John G. Proakis, pp. 171-178, 193-199, McGraw-Hill Book Co. New York, N.Y. 1983

*Primary Examiner*—Benedict V. Safourek
*Attorney, Agent, or Firm*—Kevin D. Kaschke; Rolland R. Hackbart; John A. Fisher

[57] ABSTRACT

A communications receiver (103) comprising a carrier recovery apparatus having an adjustable response time loop filter (123) responsive to carrier signal parameters determined by a signal processor (141) is disclosed. Signal reception under fading conditions is improved by detecting the received signal parameters in an energy level determinator (207), a rate of change of energy level determinator (209) and a look-up table value (221) corresponding to a position of TDMA time clock (219).

16 Claims, 3 Drawing Sheets

CARRIER RECOVERY METHOD AND APPARATUS HAVING AN ADJUSTABLE RESPONSE TIME DETERMINED BY CARRIER SIGNAL PARAMETERS

FIELD OF THE INVENTION

The present invention relates generally to communication receivers, and, more particularly, to a communication receiver with a carrier recovery method and apparatus having an adjustable response time determined by carrier signal parameters. Reference is made to U.S. Pat. No. 5,083,304, filed on behalf of Stephen Vincent Cahill on the same date herewith, containing related subject matter, and assigned to the assignee of the present invention.

BACKGROUND OF THE INVENTION

A radio communication system is comprised, at minimum, of a transmitter and a receiver. The transmitter and the receiver are interconnected by a radio-frequency channel to permit transmission of an information signal therebetween.

Typically, the information signal is impressed upon a radio-frequency electromagnetic wave by a process referred to as modulation to permit transmission of the information signal between the transmitter and the receiver. The radio-frequency electromagnetic wave is referred to as a carrier wave which is of a particular frequency, and the carrier wave, once modulated by the information signal, is referred to as a modulated information signal. The modulated information signal may be transmitted through free space to transmit thereby the information between the transmitter and the receiver.

Various modulation techniques have been developed to modulate the information signal upon the electromagnetic wave. Amplitude modulation (AM), frequency modulation (FM), phase modulation (PM), and composite modulation (CM) are four of such modulation techniques. Frequency and phase modulation techniques are collectively known as angle modulation.

In general, an amplitude modulated signal is formed by impressing (i.e., modulating) an information signal upon a carrier wave such that the information signal modifies the amplitude of the carrier wave corresponding to the value of the information signal.

An angle modulated signal formed is formed by impressing (i.e., modulating) an information signal upon a carrier wave such that the information signal modifies the phase (or the time differential of phase, frequency) of the carrier wave corresponding to the value of the information signal. Angle modulation does not cause the amplitude of the carrier wave to vary, and the information content of the modulated information signal is contained in the variation of the phase (or frequency) of the signal. Because the amplitude of an angle modulated signal does not vary, an angle modulated signal is referred to as a constant envelope signal.

A composite modulated signal is formed by impressing (i.e., modulating) an information signal upon a carrier wave such that the information signal modifies both the amplitude and the phase of the carrier wave. Conventionally, in order to form the composite modulated signal, the carrier wave (or a carrier intermediate frequency, i.e., IF, source) is first separated into sine wave and cosine wave carrier portions. Separate portions, referred to as the in-phase (or I) and the quadrature (or Q) components, of the information signal are impressed upon the cosine wave and sine wave carrier portions of the carrier wave, respectively. The sine wave and cosine wave components are then recombined, and the resultant signal, the composite modulated signal, varies in both amplitude, and, additionally, phase. Composite modulation is advantageous in that a composite modulated signal permits a greater amount of information to be transmitted within a frequency bandwidth than a signal generated by any of the previously mentioned modulation techniques. See, for instance, a discussion in the text Introduction to Communication Systems, 2nd Ed, by Ferrel G. Stremmler, ISBN 0-201-07251-3, pages 590–596.

A family type of composite modulation is quadrature amplitude modulation (QAM). In this modulation method, as conventionally applied to a binary information source, the binary data stream is separated into bit pairs. The individual bits of the bit pairs are converted from unipolar to bipolar format, passed through a pair of electric wave filters, and applied to the multiplier pair whose other inputs are the sine and cosine components of the carrier or carrier IF signal. A particular type of QAM is $\pi/4$-shift DQPSK (for differential quadrature phase shift keying), in which the input data stream is encoded so that the composite modulated carrier shifts in increments of $\pm\pi/4$ or $\pm 3\pi/4$ according to the input bit pairs. This modulation method, conventionally implemented, is discussed in Digital Communications, by John G. Proakis, 1st Ed., ISBN 0-07-050927-1, pages 171–178.

A receiver which receives a modulated information signal, such as a one formed by one of the above described modulation techniques, includes circuitry to detect, or otherwise to recreate, the information signal modulated upon the carrier wave. This process is referred to as demodulation. As many different modulated information signals may be simultaneously transmitted by a plurality of transmitters at a plurality of different frequencies, a receiver contains tuning circuitry to demodulate only those signals received by the receiver which are of certain desired frequencies. The broad range of frequencies at which modulated information signals may be transmitted is referred to as the electromagnetic frequency spectrum. Regulation of radio-frequency communications in certain frequency bands of the electromagnetic frequency spectrum minimizes interference between simultaneously transmitted signals.

For example, portions of a 100 MHz band of the electromagnetic frequency spectrum (extending between 800 MHz and 900 MHz) are allocated for radiotelephone communication, such as, for example, communication effectuated by radiotelephones utilized in a cellular, communication system. Existing radiotelephones contain circuitry both to generate and to receive radio-frequency modulated information signals.

A cellular communications system is created by positioning numerous base stations at specific locations throughout a geographical area. Each of the base stations is constructed to receive and to transmit modulated information signals simultaneously to and from radiotelephones to permit two-way communication there between. Each of the base stations is provided with means to communicate with one or more switching offices which permit connection to the conventional telephone network.

The base stations are positioned at locations such that a radiotelephone at any location throughout the geographical area is within the reception range of at least one of the base station receivers. The geographical area is divided into portions, and one base station is positioned in each portion. Each portion of the geographical area defined thereby is referred to as a "cell".

Although numerous modulated information signals may be simultaneously transmitted at different transmission frequencies, each modulated information signal, when transmitted, occupies a finite portion of the frequency band. Substantial overlapping of simultaneously transmitted modulated information signals at the same frequency in the same geographic area is impermissible as interference between overlapping signals at the same frequency could prevent detection of either of the transmitted modulated information signals by a receiver. Frequency re-use is permitted if sufficient geographic separation exists between base sites using the same frequency, because of the attenuation of signals with distance.

To prevent such overlapping, the frequency band allocated for radiotelephone communication in the U.S. is divided into channels, each of which is of a 30 KHz bandwidth. A first portion, extending between 824 MHz and 894 MHz of the frequency band, is allocated for the transmission of modulated information signals from a radiotelephone to a base station. A second portion, extending between 869 MHz and 894 MHz of the frequency band is allocated for the transmission of modulation information signals from a base station to a radiotelephone.

Increased usage of cellular communication systems has resulted, in many instances, however, in the full utilization of every available transmission channel of the frequency band allocated for cellular radiotelephone communication. Other frequency bands of the electromagnetic frequency spectrum are oftentimes similarly fully utilized.

Various attempts have been made to utilize more efficiently the frequency band allocated for radiotelephone communications to increase thereby the information transmission capacity of a cellular radiotelephone communication system. Attempts have been similarly made to use more efficiently other frequency bands of the electromagnetic frequency spectrum.

Conventionally, the modulation technique utilized by radiotelephone communication systems to form the modulated information signal thereby is angle modulation. As mentioned previously, an angle modulated signal impresses an information signal upon a carrier wave to modify the frequency (FM) or phase (PM) of the carrier wave according to the value of the information signal. However, conventional angle modulation techniques use spectral resources inefficiently.

In addition to the aforementioned inefficiency of constant-envelope modulation, the voice signal to be transmitted, which contains substantial redundant information, is modulated onto the carrier without substantial removal of the redundancy. The total bandwidth required for transmission of information for a given modulation method, is directly proportional to the amount of information to be transmitted.

Thus, spectrum can be utilized more efficiently by using composite modulation. In addition, techniques have been developed to remove much of the redundancy present in the voice signal. The output of such a process is a discretely encoded data stream whose information content is low enough that it can be transmitted in bursts using the same spectrum portion required for continuous transmission of the original voice signal. This permits transmission of more than one signal at the same frequency, using the sequential time-sharing of a single channel by several radiotelephones. This technique is referred to as time-division multiple access (or TDMA).

Thus, in order to use TDMA, an information signal (such as a voice signal) which is to be transmitted is first encoded according to a redundancy-reduction scheme. Once encoded, the information signal, in encoded form, is modulated upon a carrier wave and is transmitted in sequential intermittent time segments. Other information signals may similarly be encoded, modulated, and transmitted in intermittent bursts at the same frequency by other transmitters. Thus, a greater number information signals may be transmitted within a particular frequency bandwidth. When the information signals are generated by users of radiotelephones forming a portion of a cellular communications system, a greater number of radiotelephones may be operated within a particular frequency bandwidth when such a TDMA technique is utilized.

A receiver constructed to receive a TDMA signal, such as a TDMA composite modulated signal, reconstructs the original information signal by decoding the TDMA signal transmitted to the receiver in one of the sequential time segments.

A receiver constructed to receiver TDMA composite-modulated signals may also require circuitry to perform channel equalization in the receiver. Equalizer circuitry is required to correct for delay problems associated with reflections of signals transmitted to the receiver which arrive at the receiver at different times. Because the signal received by a receiver is actually a vector sum of all signals received at a particular frequency, the signal received by a receiver may actually be comprised of the same signal received at different times as the signal may be reflected off objects prior to reception thereof by the receiver. The signal actually received by the receiver is, therefore, the sum of all signals which are transmitted to the receiver along many different paths. The path lengths may vary, and hence the signal actually received by the receiver may vary, responsive to repositioning of the receiver. Equalizer circuitry is oftentimes formed by a processor having an appropriate software process embodied therein. In order to permit optimal operation of the equalizer circuitry, the receiver should be constructed to be linear (i.e., the demodulated signals should represent accurately the original I and Q portions modulated onto the carrier).

The number of, phase of, and intensity of, signals actually received by a receiver in a multipath environment may vary over time as a result of repositioning of the receiver, or of the objects from which a transmitted signal is reflected. As a result, the phase and signal level of a received signal varies over time. This variance is referred to as "fading" of the signal. The resultant signal strength and rate of change of signal strength at the receiver is predominantly determined by how rapidly the receiver is moving through its environment, and the frequency of the channel being used. For instance, in the cellular frequency band, and when a cellular radiotelephone is positioned in a vehicle travelling at sixty miles per hour, the signal strength of the received signal can vary by approximately twenty decibels during a five millisecond period.

When two received signals of the same phase are 180° out of phase, they effectively cancel each other out. The received signal's intensity approaches a null and the rate of change of the received signal intensity over time is rapid. Since the received signal strength intensity is low, the modulated information can be corrupted by noise present in the channel. A signal corrupted by noise can alter the state of the demodulated information thereby causing the receiver to receiver wrong information.

When a phase modulated signal is received, gain control circuitry should be of a design to permit rapid and continuous tracking of variations in received signal levels due to fading. In addition, a radiotelephone which generates a TDMA phase modulated signal to transmit an information signal in a cellular communication system meeting the requirements of the U.S. Digital Cellular Standard also measures intermittently the signal strengths of transmitters located in one or more cells. This process of testing signal strengths is referred to as mobile-assisted hand-off (or MAHO). The MAHO test also requires gain control circuitry which permits rapid and continuous tracking of a signal.

Optimal receiver performance is realized for composite modulation if the receiver incorporates a means for generating an estimate of the carrier phase of the received signal. Receivers which generate such an estimate are known as coherent receivers. The process of generating the phase estimate is known as carrier recovery. Several methods of carrier recovery are known.

One such method applicable to carrier recovery for receiving a signal under fading conditions in a TDMA system with $\pi/4$-shift DQPSK modulation is a decision feedback phase lock loop (DFPLL). A DFPLL determines what the phase-error of the received signal is relative to an ideal received signal. The phase-error signal is coupled through a loop filter to remove noise. The phase-error, with a reduced noise level, is coupled to a voltage controlled oscillator (VCO). The phase of the VCO is adjusted based on the phase-error input. The corrected phase out of the VCO is multiplied with the received signal's quadrature components to correct the phase of the received signal.

Another method applicable to carrier recovery for the aforementioned system is to raise the received signal components to the 4th power, which removes a substantial portion of the modulation, low-pass filter the resultant, and apply the low-pass filter output to a phase-correction input of the reference phase source. This can be generalized to an M-th power carrier recovery apparatus for M-ary signaling.

Another method for carrier recovery is called the generalized-Costas loop. This method requires multiplying the received signal by M-phase shifted reference signals. Where M equals 8 for $\pi/4$ DQPSK signaling. The reference phase signal is separated into eight components phase shifted by 0, $\pi/8$, $\pi/4$, $3\pi/8$, $\pi/2$, $5\pi/8$, $3\pi/4$ and $7\pi/8$ radians. These components multiply the received signal; the products generated are low-pass filtered, the filter outputs are then multiplied to generate a phase-correction signal which is applied to a phase correction input of the reference phase source.

These methods, conventionally implemented, are discussed in Digital Communications, by John G. Proakis, 1st Ed., ISBN 0-07-050927-1, pages 193-199.

For all of these systems, the response time of the carrier recovery process is determined by the filtering (or averaging) applied in the generation of the phase correction signal. In previous art, such methods were suitable for and commonly applied to systems where substantial multipath effects did not exist, such as satellite communications links, or fixed terrestrial point-to-point links. Because of the aforementioned fading effects, it is undesirable to perform carrier recovery using methods which do not adapt to variations of the received signal due to fading effects. The signal, during a fade event, is corrupted to some degree by noise energy. Thus, it corrupts the phase estimation of the received signal.

It is also true that, because of the new application of the TDMA method of transmission of information in bursts, it is undesirable not to use the timing of these bursts to time the adjustment of at least the carrier recovery elements of the receiver.

It would be desirable to have a carrier recovery apparatus or method with an adjustable response time to provide the most accurate estimate of the current phase of the received carrier signal. Therefore, there is a need for a carrier recovery method and apparatus having an adjustable response time determined by received carrier signal parameters.

SUMMARY OF THE INVENTION

A demodulator circuit demodulates an input signal having a varying amplitude and phase. The demodulator circuit includes phase tracking means having a predetermined response time for tracking the phase of the input signal. The demodulator circuit detects a rate of change of the amplitude of the input signal; and varies the predetermined response time of the phase tracking means responsive to the detected rate of change of the amplitude of the input signal.

When the input signal includes a contiguous series of data bursts, the demodulator circuit determines the position of the data bursts with respect to time; and varies the predetermined response time of the phase tracking means responsive to the determined position of the data bursts with respect to time.

DETAILED DESCRIPTION OF A PREFERRED EMBODIMENT

Figure 1:
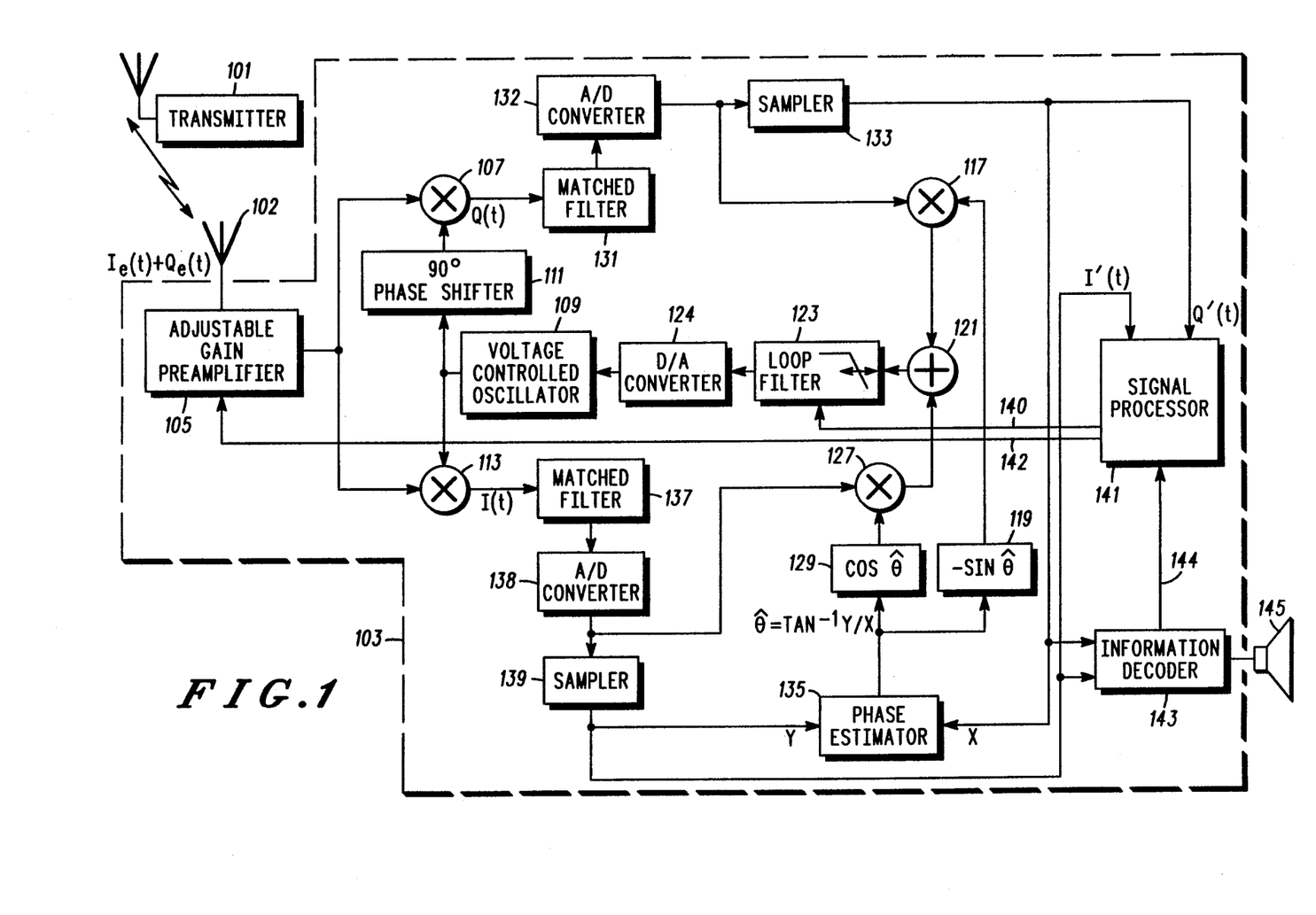
FIG. 1 is a block diagram of a transmitter and receiver which may employ the present invention.

A system which may employ the present invention is shown in the block diagram of FIG. 1. The figure shows a transmitter 101 and a receiver 103. The receiver 103 comprises a carrier recovery apparatus for $\pi/4$-shift DQPSK modulation. Receiver 103 elements comprise a signal processor 141, an information decoder 143 and an adjustable gain preamplifier 105. All other elements in the receiver collectively comprise a decision feedback phase lock loop. The decision feedback phase lock loop (DFPLL) generates a phase-error term at the output of summer block 121 which corrects the phase of the local estimate of received phase generated by voltage controlled oscillator 109. The signal processor 141 uses quadrature component signals, I'(t) and Q'(t), and synchronous signal 144 to generate a control signal 142 for adjustable gain preamplifier 105 and synchronous TDMA timing reference signal 140 for the frequency response of loop filter 123. The control signal 142 for adjustable gain preamplifier 105 is adjusted based on the energy level of the received signal 102. The control signal 140 for the frequency response of loop filter 123 is based on parameters of the received signal. These parameters comprise: the energy level, the rate of change of the energy level and the clocked TDMA event sequence of the received signal 102. The control signal 140 for loop filter 123 adjusts the response time for the DFPLL. An adjustable response time may improve the quality of the received information signal 102.

The response time in a conventional DFPLL is not adjustable during fading conditions. An adjustable response time is desirable during fading conditions. When the received signal is entering a fade, the energy level of the signal is gets weaker thereby approaching the noise floor. Under this condition, it is desirable to slow down the loop response time by narrowing the loop bandwidth filter. The narrow loop bandwidth filter increases the signal to noise ratio for the received signal. The slower loop response time enables the last good received signal's phase-error estimate to remain as long as possible before the next signal is received. Likewise, when the received signal is exiting a fade the energy level of the signal gets stronger thereby rising higher above the noise floor. Under this condition, it is desirable to speed up the loop response time by widening the loop bandwidth filter. The faster loop response time enables the next good received signal's phase-error estimate to be acquired as rapidly as possible.

The response time in the DFPLL phase-error correction system is dependent on the timing of the clocked TDMA event sequence. There are times during the TDMA event sequence when it is desirable to have a fast loop response time such as when we first lock on to a received signal. There are other times during the TDMA event sequence when it is desirable to have a slow loop response time such as when we are receiving a signal which is entering a fade.

A TDMA transmitter 101 transmits a digital information signal which is modulated on the I(t) and Q(t) quadrature component signals described previously. This information signal is broadcast to a receiver 103 which receives and demodulates the information signal. As previously noted, the information signal may be subject to random phase delays and multipath fading which degrade the quality of the information signal.

The phase error in the received information signal 102 is denoted by $I_e(t)$ and $Q_e(t)$. In receiver 103, the information signal 102 is coupled to adjustable gain preamplifier 105 which reduces input signal energy level variations as discussed in U.S. Pat. No. 5,083,304. The output signal of adjustable gain preamplifier 105 is subsequently separated into quadrature signal components I(t) and Q(t). Quadrature signal component, Q(t), is generated by applying the amplified signal to a conventional mixer 107 where a local oscillator signal generated by VCO 109 is shifted by a fixed 90° phase shifter 111 to create the Q(t) signal. The I(t) signal is created from mixer 113 and the output local oscillator signal from VCO 109. Quadrature signal components, I(t) and Q(t), are now phase coherent with the transmitted signal.

Quadrature signal component, Q(t), is filtered through matched filter 131 and subsequently coupled to analog to digital converter 132. Digitized signal, Q(t), is split into two paths. One path is mixed in mixer 117 with an estimated phase signal processed by sine determinator 119. The other path is sampled by conventional sampler 133 before being applied to a first port of phase estimator 135, a first port of signal processor 141 and a first port of information decoder 143.

Likewise, quadrature signal component, I(t), is filtered through matched filter 137 and subsequently coupled to analog to digital converter 138. Digitized signal, I(t), is split into two paths. One path is mixed in mixer 127 with an estimated phase signal processed by cosine determinator 129. The other path is sampled by conventional sampler 139 before being applied to a second port of phase estimator 135, a second port of signal processor 141 and a second port of information decoder 143.

The resultant mixed signals from mixers 117 and 127 are coupled to a conventional summer 121. The output phase-error signal of summer 121 is coupled to a digital to analog converter 124 through loop filter 123. The analog phase-error signal is applied to VCO 109. VCO 109 generates a local oscillator signal to be applied to mixer 113 and serially applied to 90° phase shifter 111 first then to mixer 107.

Terms are described for the quadrature signal Q(t) side of the DFPLL. The phase-error estimate signal of summer 121 is generated by a comparator which compares the received carrier signal phase (first input to mixer 107) to a reference signal phase (second input to mixer 107) generated by a reference signal source. The comparator comprises: mixer 107, matched filter 131, A/D converter 132, sampler 133, mixer 117, summer 121, sine and cosine determinator 119 and 129, mixer 127 and phase estimator 135. The reference signal source comprises: voltage controlled oscillator 109, D/A converter 124 and 90° phase shifter 111. Analogous terms may also be described for the quadrature signal I(t) side of the DFPLL.

Signal processor 141 receives inputs I'(t), Q'(t) and information decoder output 144. Signal processor 141 generates two outputs. The first output is a control signal 142 for adjustable gain preamplifier 105. The second output 140 is a control signal for the frequency response of loop filter 123.

Information decoder 143 receives inputs I'(t) and Q'(t) and generates outputs to the signal processor 141 and speaker 145. The information decoder represents elements of a receiver not shown in FIG. 1. The first output 144 to signal processor 141 provides information about the position of a received signal 102 in the TDMA event sequence. The second output 102 is an analog output which may be coupled to a conventional speaker 145.

Figure 2:
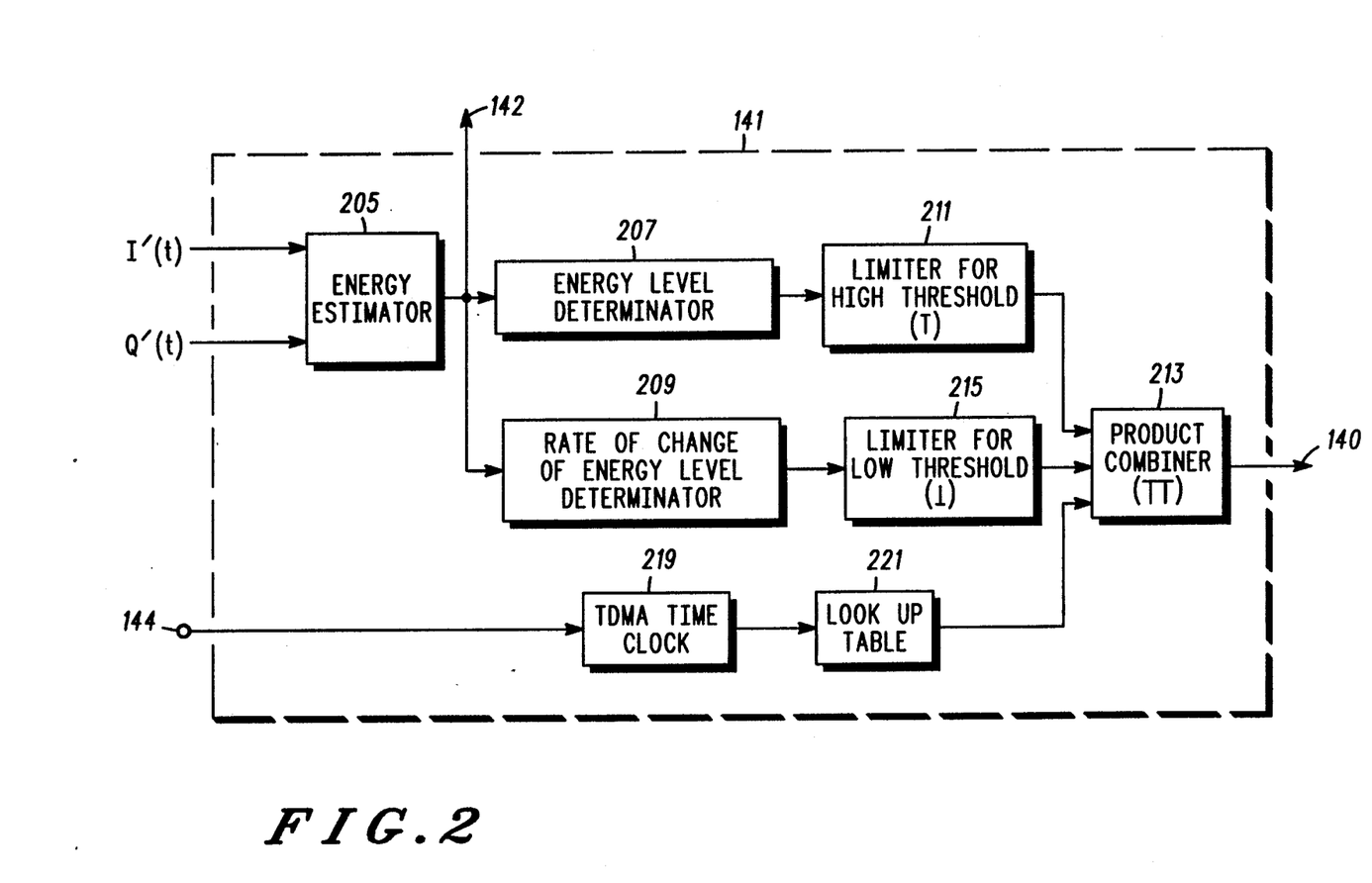
FIG. 2 is a block diagram of a signal processor which may employ the present invention.

Referring now to FIG. 2, a block diagram of signal processor 141 is shown. Digitally sampled signals, I'(t) and Q'(t), are coupled to energy estimator 205. A cellular radiotelephone transceiver in compliance with IS-54 must determine an estimate of the energy level of the received signal and process it in accordance with Section 2.4.5.4.1.2.1. Further details on the function of the energy estimator 205 will be discussed with FIG. 3.

The output of the energy estimator 205 is coupled to adjustable gain preamplifier 105 using control signal 142, energy level detector 207, and rate of change of the energy level detector 209. The output 142 from energy estimator 205 to the adjustable gain preamplifier 105 is a feedback path which reduces received input signal variations.

A software process in the signal processor determines the energy level of the received information signal. The energy level determinator 207 can be described by the following equation:

$$E(x) = 1/(10^{Vctl})$$

where Vctl is the feedback signal 142 also used to adjust the input gain to reduce input signal variations.

The output of the energy level determinator is coupled to a limiter 211. Limiter 211 creates a threshold level for high levels of received information signals. Limiter 211 only allows measured energy levels up to a maximum predetermined value. The output of 211 is coupled to product combiner 213.

The output of energy estimator 205 is also coupled into a rate of change of energy level determinator 209. The rate of change of energy level determinator describes how the energy level of the received information signal changes with time. In the preferred embodiment, the rate of change of energy level can be described by the following equation:

$$dE(x)/dt = d(1/10^{Vctl})/dt + K$$

The output of the rate of change of energy level determinator 209 is coupled to limiter 215. Limiter 215 creates a low threshold for the measure of the rate of change of energy level. The low threshold is set to a predetermined value to prevent the calculation of rate of change of the energy level from approaching zero. The output of limiter 215 is coupled to product combiner 213.

The input 144 from information decoder 143 coupled to TDMA time clock 219 provides information about the position of the received signal in the TDMA event sequence. The output of the TDMA time clock 219 is coupled to look-up table 221. Look-up table 221 contains a number of predetermined values based on the receiver design and location within the TDMA event sequence. The output of look-up table 221 is coupled to product combiner 213.

The product combiner 213 has as its inputs the energy level determinator 207 processed through a high threshold limiter 211, the rate of change of energy level determinator 209 processed through a low threshold limiter 215 and a predetermined value from look-up table 221 based on the clocked TDMA event sequence 221. The product combiner 213 is a software process which multiplies its three inputs to produce an output. The output of the product combiner is described by the following equation.

$$(1/10^{Vctl}) \times (d(1/10^{Vctl})/dt + K) \times (\text{Value from lookup table})$$

The output of the product combiner 213 is coupled to the loop filter 123.

In the preferred embodiment, the response time of the carrier recovery apparatus is adjusted with a variable bandwidth filter. Adjusting the response time may also be accomplished by varying the gain of the phase-error signal coupled to a fixed bandwidth filter or by averaging the phase-error signal over an adjustable time period.

In the preferred embodiment, signal processor 141 is implemented as a digital signal processor (DSP) employing a DSP 56001 available from Motorola, Inc. and executing a series of preprogrammed steps to determine the energy level of the received information signal, the rate of change of the energy level of the received information signal, and the position within the TDMA event sequence. The DSP combines these parameters to achieve an output which controls the decision feedback phase lock loop frequency response time for loop filter 225. The DSP also produces an output to control the adjustable gain preamplifier 105.

Figure 3:
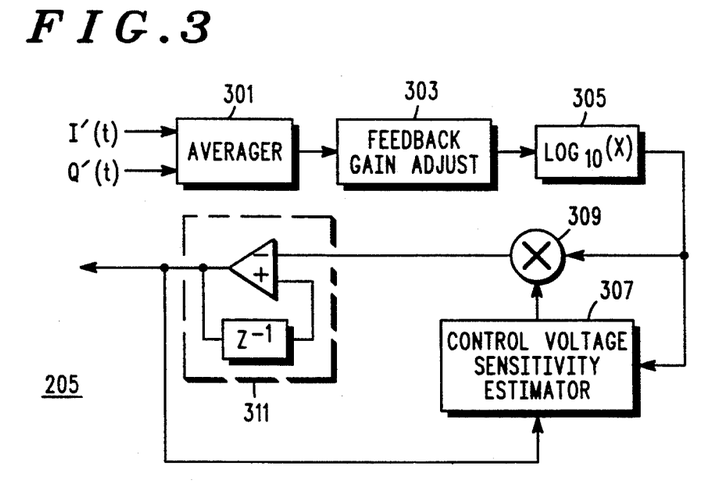
FIG. 3 is a block diagram of an energy estimator which may employ the present invention.

Now referring to FIG. 3, there is shown a block diagram of the contents of the energy estimator 205. Received quadrature component signals, I'(t) and Q'(t), are coupled to averager 301 which calculates an average signal energy from the addition of sample pairs of the squared amplitude of I'(t) and Q'(t). The averaged output is coupled to feedback gain adjust circuit 303 which adjusts the value to which $I'^2(t)$ and $Q'^2(t)$ are normalized. The logarithm (base 10) is conventionally taken (in 305) to produce the signal having logarithmic characteristics to match the exponential control function characteristics of the adjustable gain preamplifier 105. The output of $\log_{10}(x)$ calculator 305 is coupled to voltage control sensitivity estimator 307 and mixer 309. The output of mixer 309, which represents a control signal corrected for rate of change of gain versus control voltage of the adjustable gain preamplifier 105, is coupled to delay and compare function 311. The output of delay and compare function 311 is coupled to control voltage sensitivity estimator 307 to correct for errors in the estimate of the rate of change of energy level of the adjustable gain preamplifier 105, and is also output to the other functions of the receiver.

This output of the energy estimator 205 is provided as an automatic gain control (AGC) signal to adjustable gain preamplifier 105. The voltage control sensitivity estimator 307 and the energy estimator 205 are further described in U.S. Pat. No. 5,083,304.

Figure 4:
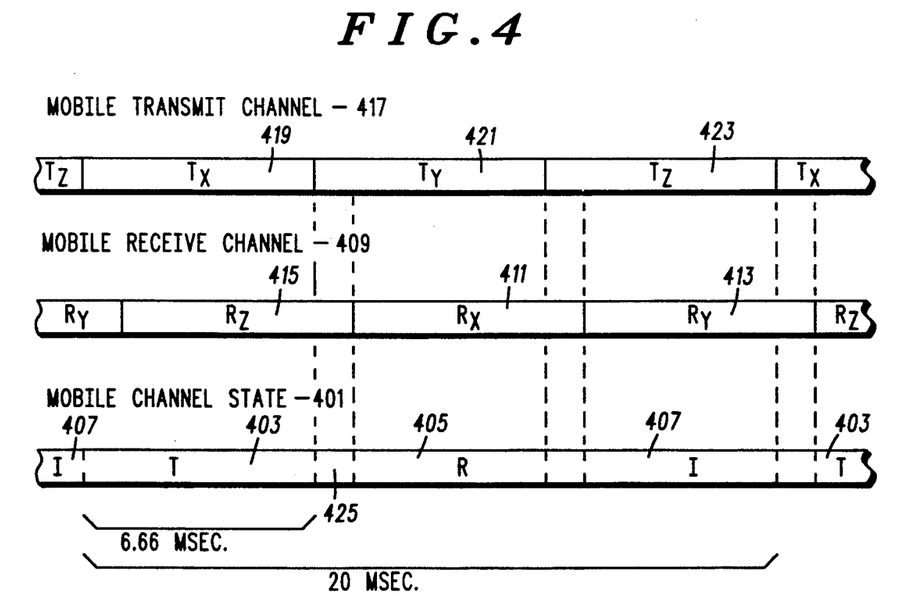
FIG. 4 is a channel state diagram for a TDMA event sequence which may employ the present invention.

Now referring to FIG. 4, there is shown a timed sequence of events for mobile transmit and receive channels in a TDMA system. The mobile channel state 401 for a TDMA event sequence is generally divided into three time slots. The three time slots comprise transmitting (T) time slot 403, receiving (R) time slot 405, and idle (I) time slot 407. Each time slot is approximately 6.66 milliseconds long thereby generating a clocked sequence of events of 20 milliseconds for all three time slots. The transmitting 403, receiving 405, and idle 407 time slots are sequentially repeated in a TDMA event sequence. As previously described, the advantage of a TDMA is to multiplex the number of users operating on the same frequency channel.

The idle time slot 407 defines a time in the TDMA event sequence in which a particular mobile unit is neither transmitting nor receiving. During this idle time slot 407, the mobile unit intermittently measures the energy levels of transmitters located in one or more cells. This process of testing signal energy level is referred to as mobile-assisted hand-off or MAHO.

The mobile receive 409 describes the receive time slots for three different mobile receivers described as $R_x$ 411, $R_y$ 413 and $R_z$ 415. Each mobile receiver can only receive information during its allocated time slot.

The mobile transmit channel 417 is likewise divided into three time slots. The three time slots comprise $T_x$ 419, $T_y$ 421, and $T_z$ 423. Each mobile unit may only transmit during its own allocated time slot. The transmit 417 and receive 419 channel pattern of the three adjacent time slots is sequentially repeated over time.

Note that the end of a transmit time slot for one particular mobile channel does not line up with the beginning of the corresponding receive mobile time slot. In particular, mobile transmit time slot $T_x$ 419 is offset from mobile receive time slot $R_x$ 411. This offset is primarily needed to account for real world system considerations such as propagation delay and the physical distance between transmitting and receiving units.

The values in the look-up table 221 and the position within a TDMA event sequence help determine response time. A position in a TDMA event sequence defines a specific location in a time slot of a mobile channel. When the TDMA time clock 219 encounters a predetermined position in the received signal 102 a value from the look-up table 221 is coupled into the product combiner 213. Specific positions with respect to time occur during the TDMA time frame when a fast loop response time is needed and other times a slow or intermediate loop response time is needed. A fast loop response time is desirable immediately prior to the receive time slot 405 in order to rapidly acquire the phase-error and lock on to the received signal. During the receive time slot 405 the loop response time is determined by the energy level of the received signal and the rate of change of the energy level of the received signal. During the idle time slot 407, the control signal to adjust the loop response time is minimized or eliminated.

Thus, the quality of the received information signal in a TDMA system can be improved in the presence of fading by adjusting the loop response time of the decision feedback phase lock loop. The loop response time is adjusted based on the energy level of the received signal, the rate of change of energy level of the received signal and the timed sequence of events in a TDMA system.

What is claimed is:

1. A demodulator circuit for demodulating an input signal having varying amplitude and phase, the demodulator circuit including phase tracking means having a predetermined response time for tracking the phase of the input signal, the demodulator circuit comprising:
   a) means for detecting a rate of change of the amplitude of the input signal; and
   means for varying the predetermined response time of the phase tracking means responsive to the detected rate of change of the amplitude of the input signal.

2. A demodulator circuit in accordance with claim 1 wherein the means for varying speeds up the predetermined response time of the phase tracking means responsive to the detected rate of change of the amplitude of the input signal being positive.

3. A demodulator circuit in accordance with claim 1 wherein the means for varying slows down the predetermined response time of the phase tracking means responsive to the detected rate of change of the amplitude of the input signal being negative.

4. A demodulator circuit for demodulating an input signal having varying phase and including a contiguous series of data bursts, the demodulator circuit including phase tracking means having a predetermined response time for tracking the phase of the input signal, the demodulator circuit comprising:
   a) means for determining the position of the data bursts with respect to time; and
   b) means for varying the predetermined response time of the phase tracking means responsive to the determined position of the data bursts with respect to time.

5. A demodulator circuit in accordance with claim 4 wherein the means for varying speeds up the predetermined response time of the phase tracking means prior to the data bursts selected for demodulation.

6. A demodulator circuit in accordance with claim 4 wherein the means for varying slows down the predetermined response time of the phase tracking means during the data bursts selected for demodulation.

7. A radio comprising:
   a) a transmitter for transmitting an output signal; and
   b) a receiver for receiving an input signal having varying amplitude and phase, the receiver including phase tracking means having a predetermined response time for tracking the phase of the input signal, the receiver comprising:
      b1) means for detecting a rate of change of the amplitude of the input signal; and
      b2) means for varying the predetermined response time of the phase tracking means responsive to the detected rate of change of the amplitude of the input signal.

8. A radio in accordance with claim 7 wherein the means for varying speeds up the predetermined response time of the phase tracking means responsive to the detected rate of change of the amplitude of the input signal being positive.

9. A radio in accordance with claim 7 wherein the means for varying slows down the predetermined response time of the phase tracking means responsive to the detected rate of change of the amplitude of the input signal being negative.

10. A radio comprising:
    a) a transmitter for transmitting an output signal; and
    b) a receiver for receiving an input signal having varying phase and including a contiguous series of data bursts, the receiver including phase tracking means having a predetermined response time for tracking the phase of the input signal, the receiver comprising:
       b1) means for determining the position of the data bursts with respect to time; and
       b2) means for varying the predetermined response time of the phase tracking means responsive to the determined position of the data bursts with respect to time.

11. A radio in accordance with claim 10, wherein the means for varying speeds up the predetermined response time of the phase tracking means prior to the data bursts selected for demodulation.

12. A radio circuit in accordance with claim 10 wherein the means for varying slows down the predetermined response time of the phase tracking means during the data bursts selected for demodulation.

13. A method of demodulating an input signal having varying amplitude and phase applied to a demodulator, the demodulator including phase tracking means having a predetermined response time for tracking the phase of the input signal, the method comprising the steps of:
    a) detecting a rate of change of the amplitude of the input signal; and
    b) varying the predetermined response time of the phase tracking means responsive to the detected rate of change of the amplitude of the input signal.

14. A method of demodulating an input signal having varying phase and including a contiguous series of data bursts applied to a demodulator, the demodulator including phase tracking means having a predetermined response time for tracking the phase of the input signal, the method comprising the steps of:
- a) determining the position of the data bursts with respect to time; and
- b) varying the predetermined response time of the phase tracking means responsive to the determined position of the data bursts with respect to time.

15. A method of communication for a radio comprising the steps of:
- a) transmitting an output signal; and
- b) receiving an input signal having varying amplitude and phase applied to a receiver, the receiver including phase tracking means having a predetermined response time for tracking the phase of the input signal, the step of receiving comprising the steps of:
  - b1) detecting a rate of change of the amplitude of the input signal; and
  - b2) varying the predetermined response time of the phase tracking means responsive to the detected rate of change of the amplitude of the input signal.

16. A method of communication for a radio comprising the steps of:
- a) transmitting an output signal; and
- b) receiving an input signal having varying phase and including a contiguous series of data bursts applied to a receiver, the receiver including phase tracking means having a predetermined response time for tracking the phase of the input signal, the step of receiving comprising the steps of:
  - b1) determining the position of the data bursts with respect to time; and
  - b2) varying the predetermined response time of the phase tracking means responsive to the determined position of the data bursts with respect to time.

* * * * *